United States Patent
Iwaya

(10) Patent No.: US 6,330,712 B1
(45) Date of Patent: Dec. 11, 2001

(54) COMPRESSED DATA PATCH SYSTEM

(75) Inventor: Takeshi Iwaya, Sapporo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/187,756

(22) Filed: Nov. 9, 1998

(30) Foreign Application Priority Data

Nov. 12, 1997 (JP) .................................................. 9-310664

(51) Int. Cl.$^7$ ...................................................... G06F 9/45
(52) U.S. Cl. ...................................................... 717/1; 717/11
(58) Field of Search ............................................ 717/11, 1

(56) References Cited

U.S. PATENT DOCUMENTS

| | | | | |
|---|---|---|---|---|
| 4,400,798 | * | 8/1983 | Francis et al. ....................... | 365/174 |
| 4,542,453 | * | 9/1985 | Patrick et al. ....................... | 364/200 |
| 4,610,000 | * | 9/1986 | Lee ....................................... | 365/189 |
| 5,087,913 | * | 2/1992 | Eastman ................................ | 341/95 |
| 5,408,672 | * | 4/1995 | Miyazawa et al. .................. | 395/800 |
| 5,481,713 | * | 1/1996 | Wetmore et al. ..................... | 395/700 |
| 5,790,860 | * | 8/1998 | Wetmore et al. ..................... | 395/705 |

FOREIGN PATENT DOCUMENTS

| | | | |
|---|---|---|---|
| 2-162439 | * | 6/1990 | (JP) . |
| 3-265948 | * | 11/1991 | (JP) . |
| 6-36549 | * | 2/1994 | (JP) . |
| 6-250922 | * | 9/1994 | (JP) . |
| 7-129396 | * | 5/1995 | (JP) . |
| 8-44551 | * | 2/1996 | (JP) . |

* cited by examiner

Primary Examiner—Kakali Chaki
Assistant Examiner—Wei Zhen
(74) Attorney, Agent, or Firm—Young & Thompson

(57) ABSTRACT

A compressed data patch system which stores patch data in an erasable non-volatile memory device to allow compressed data stored in a non-erasable memory device to be processed as if the compressed data was modified, thus reducing the resources and the time required for patching. To do so, compressed data 310 stored in a compressed data storing module 300 is read in response to a read request received via an external device, the compressed data is decompressed by a decompressing module 210 and is stored in a temporary storage buffer, patch data 510 stored in a patch data storing module 500 is read, and the decompressed data is patched by a patching module 400.

7 Claims, 5 Drawing Sheets

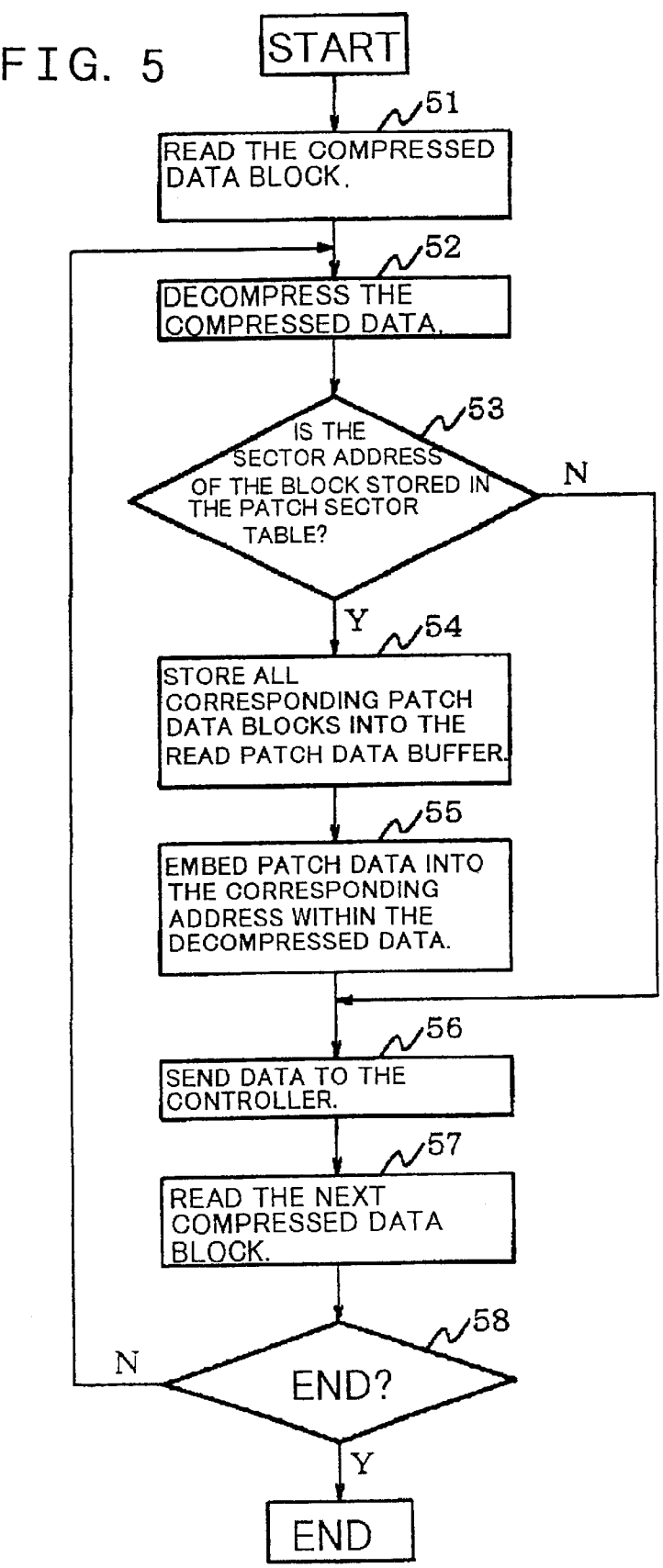

COMPRESSED DATA PATCH SYSTEM

FIELD OF THE INVENTION

The present invention relates to a compressed data patch system for use on a read-only memory device, and more particularly to a compressed data patch system allowing compressed data in the read-only memory device to be modified as if it were re-written.

BACKGROUND OF THE INVENTION

A conventional system for modifying data stored in non-erasable read-only memory devices (such as Read Only Memory, hereafter described as ROM) is disclosed in Japanese Patent Kokai Publication JP-A No. Hei 7-129396 (1995). However, the publication does not describe a technology for patching compressed data that is stored in memory. Therefore, when compressed data stored in ROM must be modified to increase functionality or to correct errors, ROM must be replaced regardless of the amount of correction.

Another conventional system for patching a microprogram or a program, at a low cost, is disclosed in Japanese Patent Kokai Publication JP-A No. Hei 8-44551 (1996). The technology requires two types of data, that is, compressed data that is to be patched and patch data that is used to patch the compressed data, to reside in the same device. Therefore, when the memory device is a non-erasable read only device such as ROM, ROM must be replaced even if only patch data must be replaced

SUMMARY OF THE DISCLOSURE

According to the inventor's investigation toward the present invention the conventional systems have the following drawbacks.

Japanese Patent Kokai Publication JP-A No. Hei 7-129396 does not disclose the above-described conventional patch system for patching compressed data.

A disadvantage of the technology disclosed in Japanese Patent Kokai Publication JP-A No. Hei 8-44551 is that, when a device containing compressed data to be patched and data used to patch the compressed data is read-only, the device must be replaced even if only the patch data must be replaced.

In addition, the technology disclosed in Japanese Patent Kokai Publication JP-A No. Hei 8-44551 compares decompressed read data with patch data on a one-to-one basis and, if their addresses match, sends patch data, in place of decompressed data, to a higher-level unit, meaning that the amount of patch data equals the amount of data of a decompressed read data unit. Therefore, when the amount of one unit of read data is small, the number of read operations increases and the processing speed slows down. Conversely, when the amount of one unit of read data is large, the amount of patch data also becomes large.

Therefore, it is an object of the present invention to provide a novel compressed data patch system allowing compressed data in the read-only memory device to be modified as if it were re-written.

Particularly, it is a concrete object of the present invention to provide a compressed data patch system which stores patch data in an erasable non-volatile memory device to allow compressed data stored in a non-erasable memory device, such as ROM, to be processed as if the compressed data were re-written. This system eliminates the need for replacing the memory device even when only patch data is changed, allowing patch data to be changed repeatedly. In addition, this system, which reduces the amount of data without affecting the speed, requires less resources, costs, and time for patching compressed data.

A compressed data patch system according to a first aspect of the present invention comprises first storing means for storing compressed data, the first storing means being read-only and non-erasable; second storing means for storing patch data to be used for patching the compressed data, the second storing means being erasable and non-volatile; data decompressing means for reading a predetermined amount of the compressed data in response to a request received from an external device, for decompressing the compressed data stored in the first storing means, for storing the decompressed data temporarily, and for sending patched data to the external device; and patching means for patching the data stored temporarily in the data decompressing means using the patch data stored in the second storing means.

A compressed data patch system according to a second aspect of the present invention provides a compressed data patch system as defined by the first aspect wherein the patch data comprises a patch data block module and an index table, the patch data block module comprising at least one patch data block which contains the patch data, size data thereof, and patch start address data. The index table comprises, in order of indexes, one or more indexes each of which contains start address of one or more patch data blocks corresponding to the index which is a high-order word of a physical address of the decompressed data. The plurality of patch data blocks are stored in the patch data block module in order of indexes and, within the same index, in order of patch start physical addresses.

According to a third aspect of the present invention, the compressed data patch system defined by the second aspect has following features: The patch data block further comprises link flag data which is set to a corresponding value if the patch data block is followed by another patch data block within the same index According to a fourth aspect, the compressed data patch system as defined by the first aspect has following features: The patching means comprises a patch sector address storing means which registers a sector address calculated by dividing a patch start physical address by a predetermined amount of data. The patch start physical address is contained in the patch data, the predetermined amount of data being a unit of data read from an external device, and a patch sector address table into which the sector address is stored.

According to a fifth aspect, the compressed data patch system as defined by the fourth aspect is featured as follows: The patching means further comprises patch sector address checking means which checks if the sector address of the data stored temporarily in the data decompressing means is registered in the patch sector address table and, if the sector address is registered in the table, starts a patching operation.

According to a sixth aspect, the compressed data patch system as defined by the fifth aspect is featured as follows: In response to the patch sector address checking means, the patching means reads from the second storing means at least one patch data block belonging to the sector address whose matching entry is found in the patch sector address table and embeds the at least one patch data block into the decompressed data stored temporarily in the data decompressing means.

According to a seventh aspect, the compressed data patch system as defined by the first aspect is featured as follows: When the patch data on the compressed data is changed, the patch data in the second string means may be re-written.

BRIEF DESCRIPTION OF THE DRAWINGS

FIG. 2(a) shows how data is stored in an index table 511 and a patch data block module 512, and FIG. 2(b) shows the details of a patch data block 5120.

FIG. 5 is a flowchart showing the preferred embodiment of the compressed data patch system according to the present invention.

DETAILED DESCRIPTION

A preferred embodiment of the present invention is described below.

Figure 1:
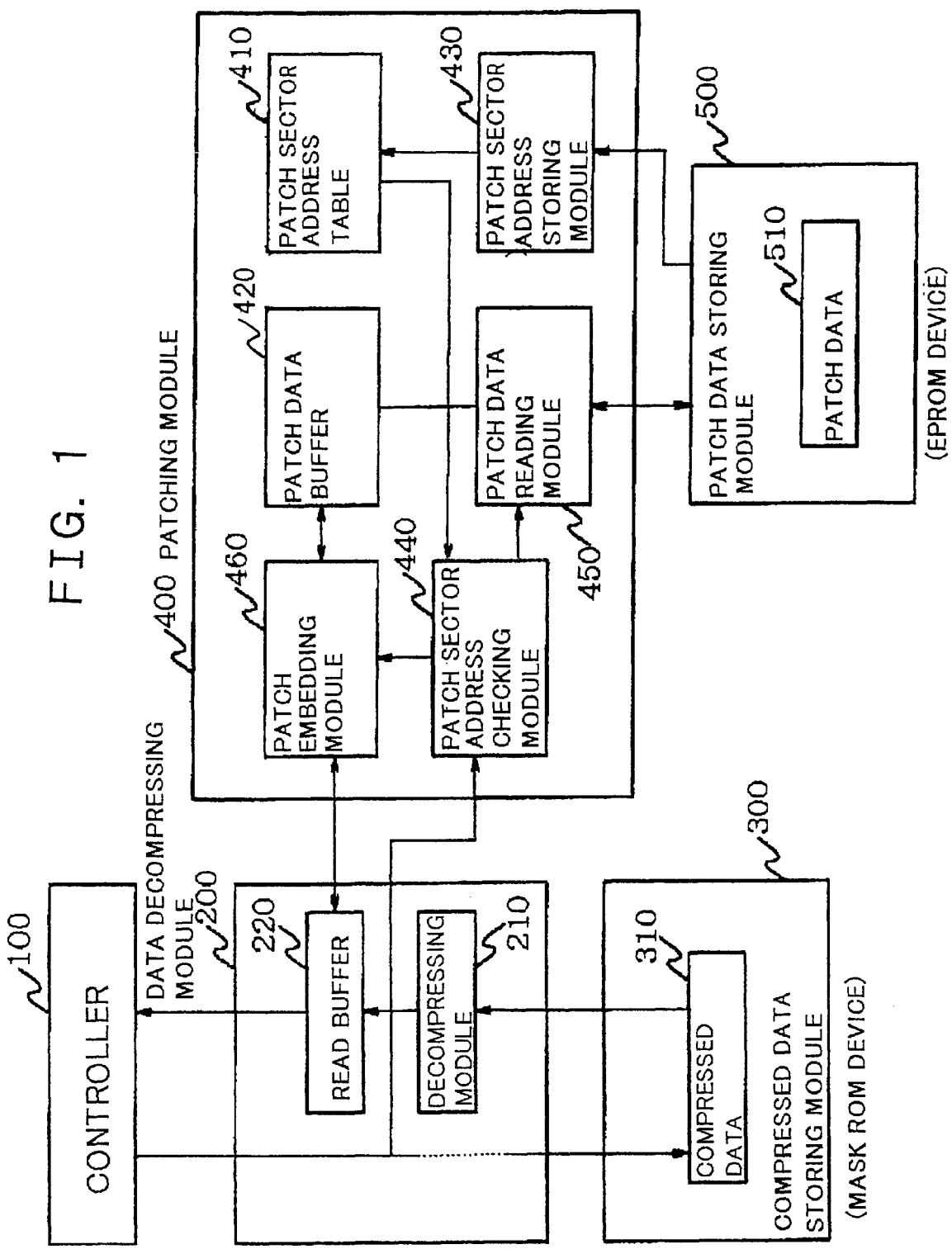
FIG. 1 is a block diagram showing a preferred mode of a compressed data patch system according to the present invention.

FIG. 1 is a block diagram showing the configuration of the preferred mode of a compressed data patch system according to the present invention.

As shown in FIG. 1, the compressed data patch system used in this embodiment comprises a compressed data storing module 300 which is an non-erasable read-only memory device (such as a mask ROM device) in which compressed data 310 is stored, a patch data storing module 500 which is an erasable non-volatile memory device (such as an EPROM device) in which patch data 510 is stored, a controller 100 which is the nucleus of the OS (operating system), a patching module 400 which patches compressed data 310 using patch data 510, and a data decompressing module 200 which reads compressed data 310 from the compressed data storing module 300 and stores the data temporarily in a read buffer 220 and which, when a patch request is generated, sends the data, which has been patched by the patching module 400, to the controller 100.

The amount of data that is read in response to a read request from the controller 100 is fixed (for example, 512 bytes). In the following description, this reading method is referred to as sector-basis (or sector unit-basis) reading.

The position of data is expressed by the physical address of the data relative to the start of a program and so on, by a value representative of the position of the group to which the data belongs, for example, a physical address divided by the sector size (round up to an integer), or by the value of the index which is the high-order word of the physical address.

The patching module 400 comprises a patch sector address table 410 in which the sector address of patch data stored in the patch data storing module 500 is stored, a patch sector address storing module 430 which calculates the sector address of a sector to which patch data stored in the patch data storing module 500 belongs and which stores the calculated sector address into the patch sector address table 410. The patching module 400 further comprises a patch sector address checking module 440 which checks if the sector address of decompressed data in the read buffer 220 is found in the patch sector address table 410 and, if the address is found, starts a patch data reading module 450 and a patch embedding module 460. Further, there is a patch data reading module 450 which, when started by the patch sector address checking module 440, reads patch data corresponding to the patch sector address from the patch data storing module 500 and stores the patch data in a patch data buffer 420. In the patch data buffer 420, patch data read by the patch data reading module 450 is stored. Further, the patch embedding module 460 patches the compressed data stored in the read buffer 220 using patch data stored in the patch data buffer 420.

Figure 2:
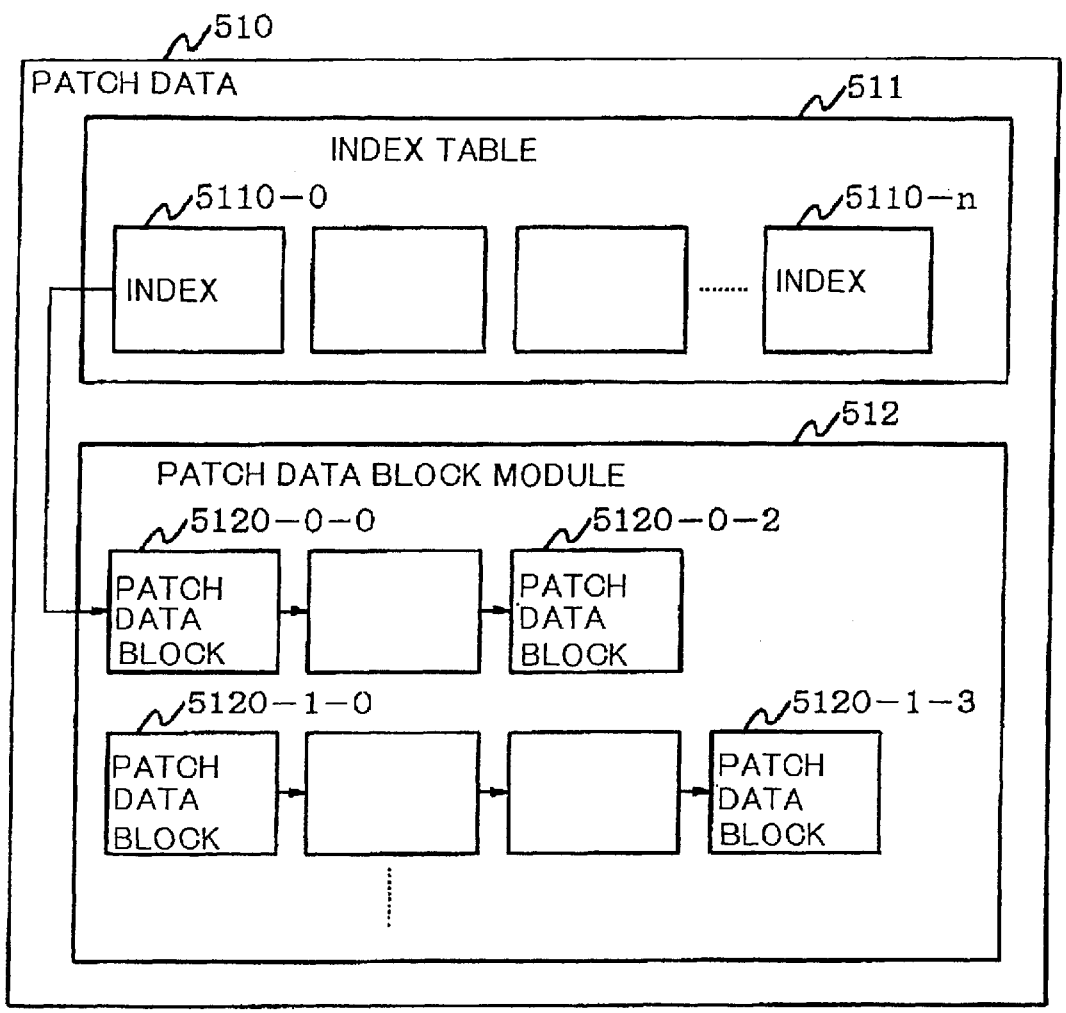
FIG. 2 is a diagram showing how data is stored in the compressed data patch system according to the present invention.
Figure 2:
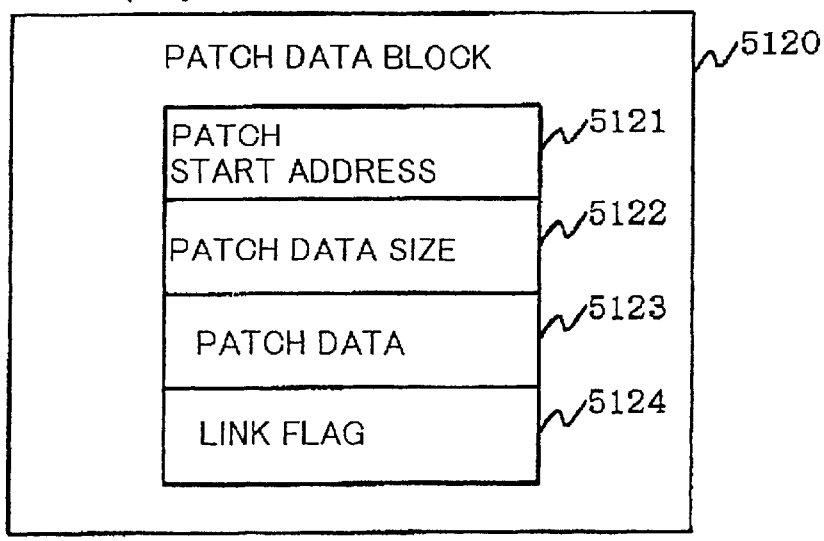
Figure 3:
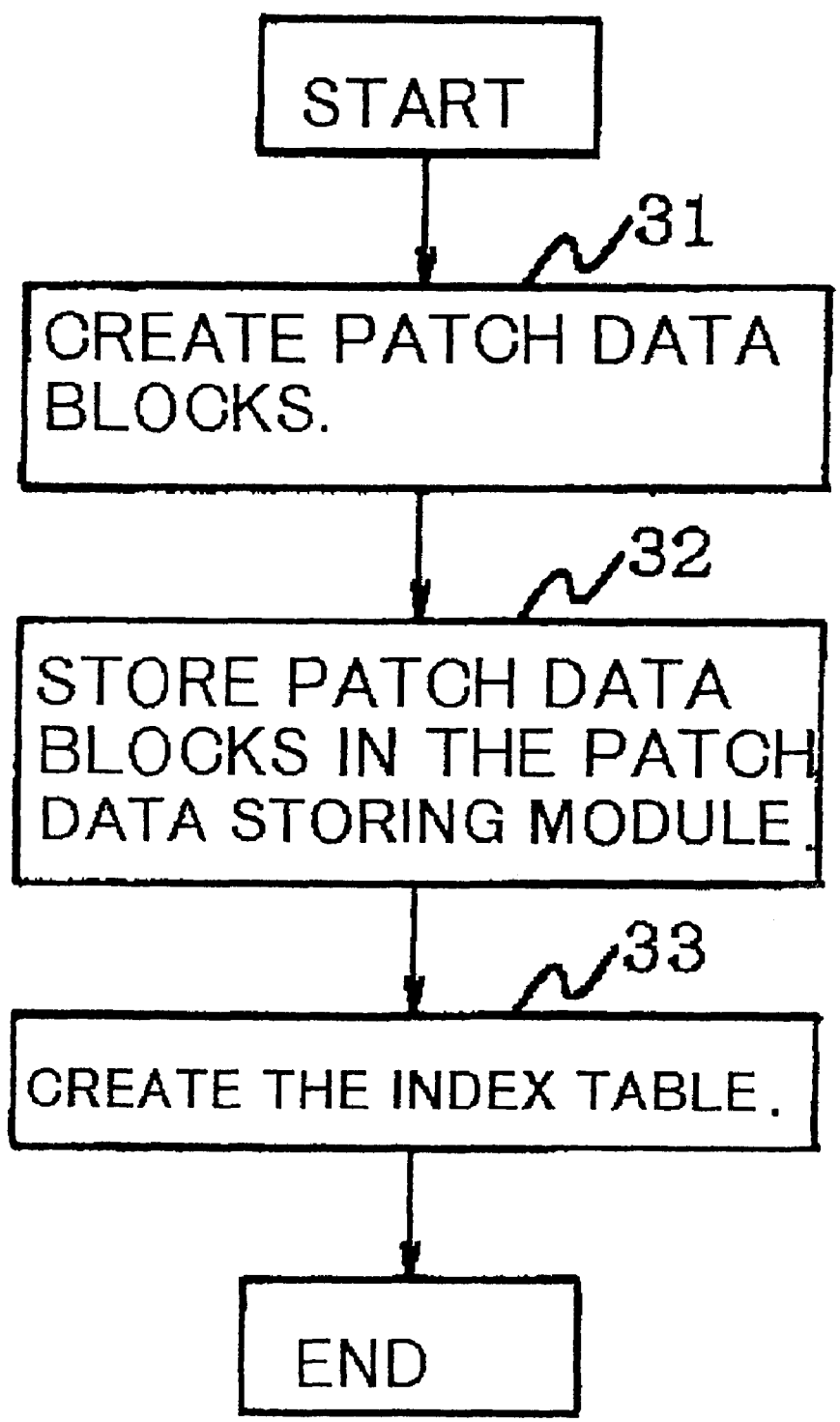
FIG. 3 is a flowchart showing how data is stored in a patch data storage module 500.

FIG. 2 shows the details of the patch data 510 stored in the patch data storing module 500. The patch data 510 is composed of an index table 511 and a patch data block module 512 (FIG. 2(a)). The index table 511 contains a plurality of indexes each pointing to the start address of a plurality of patch data blocks corresponding to the index. The patch data block module 512 contains a plurality of patch data blocks 5120 each being a patch data unit (FIG. 2(a)). FIG. 3 is a flowchart showing how patch data 510 is created. The following describes the creation of the patch data 510.

Each of the plurality of patch data blocks 5120 contains patch data 5123 used to patch compressed data, a patch data size 5122 indicating the size of the patch data, a patch address (physical address), and a link flag 5124 which will be described later (step 31) (FIG. 2(b)).

The plurality of patch data blocks 5120 are stored in the patch data block module 512 in the order of their index values. Within the same index, the plurality of patch data blocks 5120 belonging to that index are stored in order of the patch start address. When one patch data block 5120 is followed by another patch data block 5120, the link flag 5124 of the immediately preceding patch data block 5120 is set. "p" in the patch data block reference number 5120-p-q in FIG. 2(a) indicates the index value, and "q" indicates the serial number of the patch data block 5120 within the corresponding index (step 32).

The index table 511 is created as follows. That is, the start address (within the patch data storing module 500) of the plurality of patch data blocks 5120 belonging to index p is stored in the p-th index relative to the start address (within patch data storing module 500) of the index table 511. "p" in the index reference number 5110-p in FIG. 2(a) indicates the index value (step 33).

The index table 511 is created as described above and is stored in the patch data storing module 500.

Figure 4:
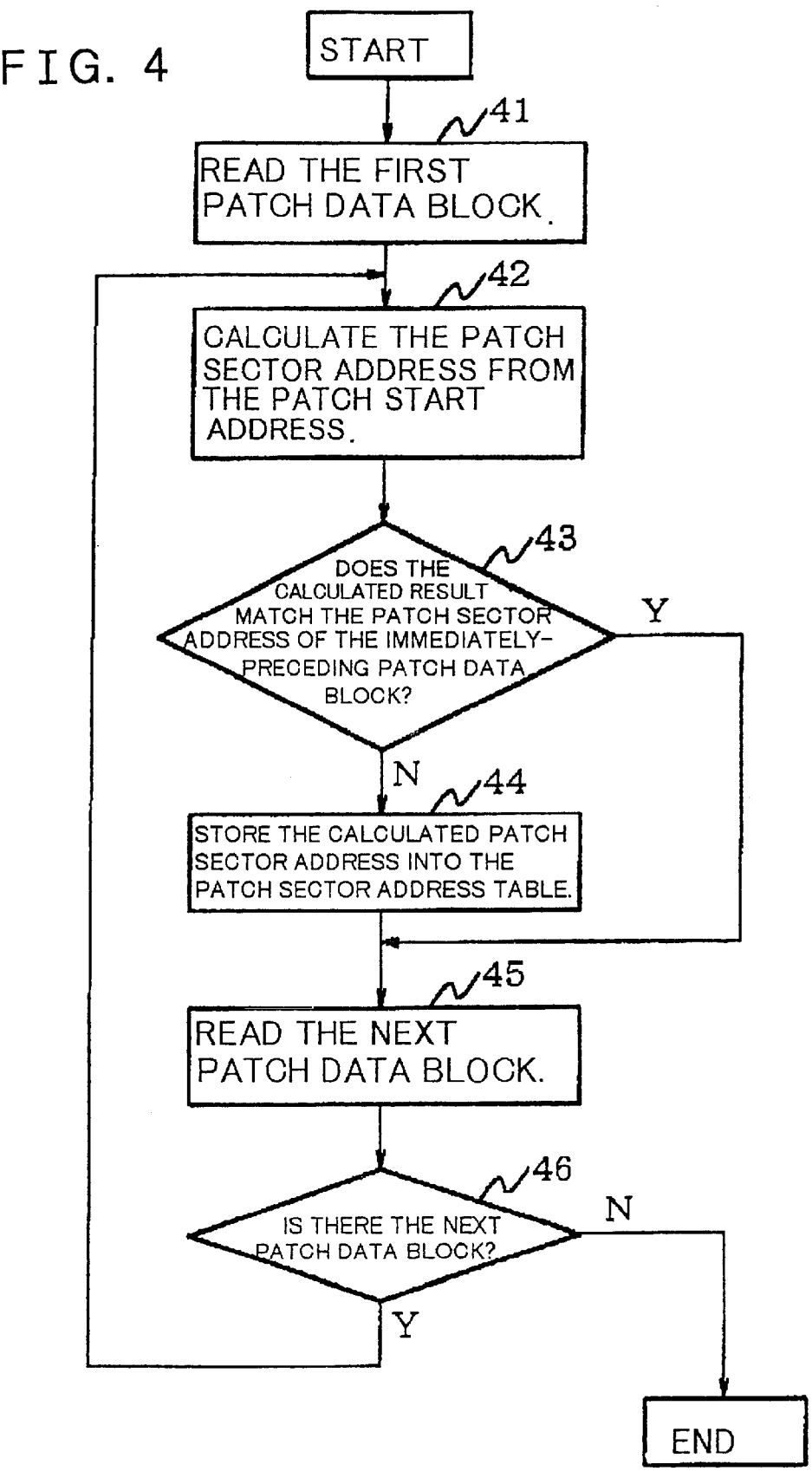
FIG. 4 is a flowchart showing the initial operation of a patching module 400.

Next, the operation of the patching module 400 is described. First, the patch sector address storing module 430 finds the patch sector address of each patch data block stored in the patch data storing module 500 and stores the patch sector address into the patch sector address table 410. FIG. 4 shows how this operation is performed. The initial operation of the patching module 400 is described below with reference to FIGS. 1, 2, and 4.

First, the patch sector address storing module 430 reads, via the index table 511, the first patch data block 5120 stored in the patch data storing module 500 (step 41) and calculates the batch sector address from a patch start address 5121 (step 42). To do so, the patch sector address storing module 430 divides the patch start address 5121 by the sector size and rounds up the result to the next integer. The module then compares the calculated integer value with the patch sector address of the immediately-preceding patch data block 5120 (step 43). If they do not match (N in step 43) (for example, in case where they do not match when the first patch data block 5120 is processed), the patch sector address storing module 430 stores the calculated patch sector address into patch sector address table 410 (step 44), checks the link flag 5124, and reads the next patch data block 5120 (step 45). If they match (Y in step 43), the patch sector address storing module 430 references the link flag 5124 and reads the next patch data block 5120 (step 45).

The patch sector address storing module 430 repeats the above operation (loop through steps 42–46Y) until all the patch data blocks 5120 stored in the patch data storing module 500 are processed. When all the patch data blocks 5120 are processed (N in step 46), the patch sector address storing module 430 ends the initial operation. At this time, all patch sector addresses of the patch data blocks 5120 stored in the patch data storing module 500 are now stored in the patch sector address table 410.

Next, the following explains how patch operation on the compressed data 310 stored in the compressed data storing module 300 is performed with the use of the patch data 510. FIG. 5 shows the patch operation performed by the patching module 400. The patch operation of the patching module 400 is described below by referring to FIGS. 1, 2, and 5.

In response to a read instruction (including the read start address) from the controller 100, a decompressing module 210 decompresses the compressed data 310 read on the sector unit-basis and stored in the compressed data storing module 300 and stores the decompressed result temporarily into the read buffer 220 (steps 51 and 52). Upon receiving the read start address, the patch sector address checking module 440 finds the sector address corresponding to the read start address and checks if the sector address is stored in the patch sector address table 410 (step 53).

If there is no such sector address in the patch sector address table 410 in step 53 (N in step 53), there is no patch data for the decompressed data temporarily stored in the read buffer 220. Then, the data decompressing module 200 sends this data to the controller 100 (step 56) and reads the next compressed data 310 (step 57) for use in the next decompression and patch operation.

If the patch sector address checking module 440 finds a matching sector address in the patch sector address table 410 in step 53 (Y in step 53), there is contained data to be patched in the decompressed data temporarily stored in the read buffer 220. Then, the patch sector address checking module 440 starts the patch data reading module 450 and the patch embedding module 460. In response, the patch data reading module 450 references the index table 511 and the link flags 5124 to read all patch data blocks 5120 belonging to the corresponding sector address and stores those patch data blocks into the patch data buffer 420 (step 54). The patch embedding module 460 references the patch data blocks 5120 stored in the patch data buffer 420 and embeds the patch data 5123 into the corresponding address within the decompressed data temporarily stored in the read buffer 220 (step 55). After patching the decompressed data, the data decompressing module 200 sends the patched data from the read buffer 220 to the controller 100 (step 56) and then decompresses the next compressed data 310 (step 57).

The above-described operation is repeated (loops through steps 53–58N) until all the compressed data 310 in the compressed data storing module 300 is processed. When all the compressed data 310 is processed (Y in step 58), the patch operation ends.

As described above, the system according to the present invention stores patch data in an erasable non-volatile memory device. Thus, even when patch data must be changed, this system allows compressed data stored in a non-erasable memory device to be processed as if the compressed data was re-written, eliminating the need for replacing the memory device. The ability to change only patch data allows the patch data to be changed as many times as is necessary. In addition, this system, which uses patch data smaller in amount than the that of the data read unit without affecting the speed, reduces the amount of patch data stored in the patch data storing module, thus requiring less resources, costs, and time for patching compressed data.

In the description of the present invention, an EPROM (Erasable PROM) is used as an erasable nonvolatile memory device. A magnetic disk unit, a non-volatile RAM, or any device having the necessary function may also be used.

As described above, when compressed data stored on a non-erasable read-only memory device such as a mask ROM or a CD-ROM must be changed, the compressed data is patch system according to the present invention uses patch data stored in an erasable non-volatile memory device. Therefore, even when there is a need to change patch data, this system allows compressed data to be processed as if it was changed, reducing the cost and the time required for patching compressed data.

In addition, storing patch data in an erasable memory device enables only patch data to be changed as many time as is necessary. Therefore, this system quickly corrects errors in a program stored in a non-erasable read-only memory device in the form of compressed data, increasing the reliability of the computer system.

According to the present invention, the size of patch data is smaller than that of a data read unit. This reduces the number of read operations and the size of patch data.

Any combination of any elements disclosed herein may be selected according to the gist of the present invention and any objects of the present invention will become apparent in the entire disclosure.

It should be noted that modification obvious in the art may be done without departing the gist and scope of the present invention as disclosed herein and claimed hereinbelow as appended.

What is claimed is:

1. A compressed data patch system comprising:
    a first storing module storing compressed data, the first storing module being read-only and non-erasable;
    a second storing module storing patch data to be used for patching the compressed data, the second storing module being erasable and non-volatile;
    a data decompressing module reading a redetermined amount of the compressed data in response to a request received from an external device, decompressing the compressed data stored in said first storing module, storing the decompressed data temporarily, and sending patched data to the external device; and
    a patching module patching the data stored temporarily in said data decompressing means using the patch data stored in said second storing module,
    wherein the patch data is composed of a patch data block module and an index table,
    the patch data block module comprising at least one patch data block which contains patch data, size data of the patch data, and patch start address data,
    the index table comprising, in order of indexes, one or more indexes each of which contains start address of one or more patch data blocks corresponding to the index which is a high-order word of a physical address of the decompressed data; and
    wherein said plurality of patch data blocks are stored in said patch data block module in order of indexes and, within the same index, in order of patch start physical addresses.

2. A compressed data patch system as defined in claim 1 wherein the patch data block further comprises link flag data which is set to a corresponding value if the patch data block is followed by another patch data block within the same index.

3. A compressed data patch system as defined in claim 1 wherein, when the patch data on the compressed data is changed, the patch data in the second storing means may be re-written.

4. A compressed data patch system comprising:

a first storing module storing compressed data, the first storing module being read-only and non-erasable;

a second storing module storing patch data to be used for patching the compressed data, the second storing module being erasable and non-volatile;

a data decompressing module reading a predetermined amount of the compressed data in response to a request received from an external device, decompressing the compressed data stored in said first storing means, storing the decompressed data temporarily, and sending patched data to the external device; and a patching module patching the data stored temporarily in said data decompressing means using the patch data stored in said second storing means, wherein said patching module comprises, a patch sector address storing module which registers a sector address calculated by dividing a patch start physical address by a predetermined amount of data, the patch start physical address being contained in the patch data, the predetermined amount of data being a unit of data read from an external device, and a patch sector address table into which the sector address is stored.

5. A compressed data patch system as defined in claim 4 wherein said patching means further comprises patch sector address checking means which checks if the sector address of the data stored temporarily in the data decompressing means is registered in the patch sector address table and, if the sector address is registered in the table, starts a patching operation.

6. A compressed data patch system as defined in claim 5 wherein, in response to the patch sector address checking means, the patching means reads from the second storing means at least one patch data block belonging to the sector address whose matching entry is found in the patch sector address table and embeds said at least one patch data block into the decompressed data stored temporarily in the data decompressing means.

7. A compressed data patch system as defined in claim 4, wherein when the patch data on the compressed data is changed, the patch data in the second storing means may be rewritten.

\* \* \* \* \*